United States Patent [19]

Barry

[11] Patent Number: 4,482,970

[45] Date of Patent: Nov. 13, 1984

[54] BOOLEAN FILTERING METHOD AND APPARATUS

[75] Inventor: Patrick E. Barry, Port Jefferson, N.Y.

[73] Assignee: Grumman Aerospace Corporation, Bethpage, N.Y.

[21] Appl. No.: 319,040

[22] Filed: Nov. 6, 1981

[51] Int. Cl.³ .......................... H04N 7/12; G01S 13/00
[52] U.S. Cl. ................................. 364/517; 343/5 CF; 358/105
[58] Field of Search ................. 343/5 CE, 5 CF; 364/516, 517; 358/105

[56] References Cited

U.S. PATENT DOCUMENTS

| | | | |
|---|---|---|---|
| 3,253,277 | 5/1966 | Freston | 343/7 |
| 3,399,404 | 8/1968 | Githens et al. | 343/5 |
| 3,460,137 | 8/1969 | Ralston | 343/5 |
| 3,699,573 | 10/1972 | Andrews et al. | 343/7.3 |
| 3,731,304 | 5/1973 | Caspers et al. | 343/5 |
| 3,787,852 | 1/1974 | Puckette et al. | 343/7.7 |
| 3,908,116 | 9/1975 | Bjornsen | 235/152 |
| 3,942,163 | 3/1976 | Goyal | 340/173 R |
| 3,952,188 | 4/1976 | Sloate | 235/193 |
| 3,997,973 | 12/1976 | Bass | 333/70 T |
| 4,004,157 | 1/1977 | Baertsch et al. | 307/235 C |
| 4,011,438 | 3/1977 | Aufderheide et al. | 235/152 |
| 4,011,442 | 3/1977 | Engeler | 235/193 |
| 4,013,998 | 3/1977 | Bucciarelli et al. | 343/5 CF |
| 4,023,170 | 5/1977 | Buss | 343/7.7 |
| 4,032,867 | 6/1977 | Engeler et al. | 333/70 T |
| 4,034,199 | 7/1977 | Lampe et al. | 235/193 |
| 4,035,628 | 7/1977 | Lampe et al. | 235/193 |
| 4,039,978 | 8/1977 | Heller | 333/70 T |
| 4,045,795 | 8/1977 | Fletcher et al. | 343/5 CM |
| 4,063,200 | 12/1977 | Mattern | 333/70 A |
| 4,064,533 | 12/1977 | Lampe et al. | 358/105 |
| 4,068,311 | 1/1978 | Whitehouse et al. | 364/827 |
| 4,133,004 | 1/1979 | Fitts | 358/125 |
| 4,220,967 | 9/1980 | Ichida et al. | 358/105 |
| 4,240,109 | 12/1980 | Michael et al. | 358/105 |
| 4,364,087 | 12/1982 | Storey et al. | 358/105 |
| 4,383,272 | 5/1983 | Netrauali et al. | 358/105 |

FOREIGN PATENT DOCUMENTS 894148  4/1962  United Kingdom ................ 364/516

OTHER PUBLICATIONS

"The Application of Digital Filters for Moving Target Indication", IEEE Transactions on Audio and Electroacoustics, vol. AU-19, No. 1, Mar. 1971, pp. 72-77.
"An Analysis of the Detection of Repeated Signals in Noise by Binary Integration", IRE Transactions Information Theory, Mar. 1955, pp. 1-9.

Primary Examiner—Jerry Smith
Assistant Examiner—Michael R. Fleming
Attorney, Agent, or Firm—Morgan, Finnegan, Pine, Foley & Lee

[57] ABSTRACT

A filtering method and apparatus for discriminating targets from noise in space-time data consisting of a plurality of binary data frames, each containing an equal number of points, are disclosed. Noise filtering for target detection is performed by recursively determining whether the points of a sequence of M of the binary data frames form at least one continuous string, or at the next highest level of discrimination, monotonic continuous string by logically comparing each binary data frame with the two binary data frames which precede and follow it on a point by point basis.

7 Claims, 4 Drawing Figures

BOOLEAN FILTERING METHOD AND APPARATUS

BACKGROUND OF THE INVENTION

This invention relates to the field of data signal processing, and more particularly to a method and apparatus for discriminating noise from linear target tracks in three-dimensional threshold mosaic sensor data.

The typical processing sequence associated with the detection and tracking of moving targets using a staring mosaic sensor system can be broken down into five functional subprocessors: Background Elimination, Event Detection, Track Detection, Track Association and Trajectory Estimation. After the low frequency portion of the background has been eliminated, the simplest type of event detection usually considered is single bit thresholding of the residual data frames. The resulting binary data frames are then inputted to the track detection processor that discriminates target bits from false point bits by using the linear nature of the target tracks in the space-time data.

The track search procedure can be very costly in terms of its computational speed and memory requirements, especially in the case of high false point rates on the incoming data. This in turn results in requiring either the setting of a high threshold in the Event Detection processor which will cause dim targets to go undetected, or that the signal to noise ratio on those dim targets be sufficiently high so as to allow for high thresholds with acceptance probability of target detection. Since the requirement of high signal-to-noise ratio greatly impacts the size and performance required of the optical systems, there are significant gains to be realized by developing track detection techniques which can function with high false point rates on the thresholded data.

Filtering techniques for discriminating noise from signal are well known in the art. The ideal filter, commonly referred to as a matched filter, is one where the output signal-to-noise ratio is maximized.

Many attempts have been made to approximate the characteristics of the ideal filter utilizing analog signal processing techniques, however, the rigid control of device parameters necessitated by the utilization of analog devices and the susceptibility of analog devices to noise have certain limitations in some applications.

Similarly, attempts have been made to approximate the characteristics of the ideal filter utilizing digital signal processing techniques, however, they often require precision components, such as, analog-to-digital converters, high-speed multipliers and adders. These components increase the cost of the filter considerably and in some applications may present a cost justification limitation.

It is accordingly a general object of the present invention to overcome the aforementioned limitations and drawbacks associated with conventional filtering techniques and to fulfill the needs mentioned above.

It is a particular object of the invention to provide an improved method and apparatus for discriminating noise from signal.

It is a further object of the invention to provide a Boolean filtering method and apparatus for discriminating noise from linear target tracks in three-dimensional mosaic sensor data.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a real time method and apparatus for filtering data consisting of a plurality of binary data frames each containing an equal number of points the method comprising the steps of: storing sequentially each of the plurality of binary data frames; and logically comparing each of the plurality of stored binary data frames with the binary data frame which preceded it and the binary data frame which followed it on a point by point basis and outputting the filtered data when the compared points in the plurality of stored binary data frames form a continuous string; and the apparatus comprising: means for storing sequentially each of the plurality of binary data frames; and means for logically comparing each of the plurality of stored binary data frames with the binary data frame which preceded it and the binary data frame which followed it on a point by point basis and outputting the filtered data when the compared points in the plurality of stored binary data frames form a continuous string.

BRIEF DESCRIPTION OF THE DRAWINGS

Serving to illustrate an exemplary embodiment of the invention are the drawings of which.

DETAILED DESCRIPTION OF PREFERRED EMBODIMENT

Figure 1:
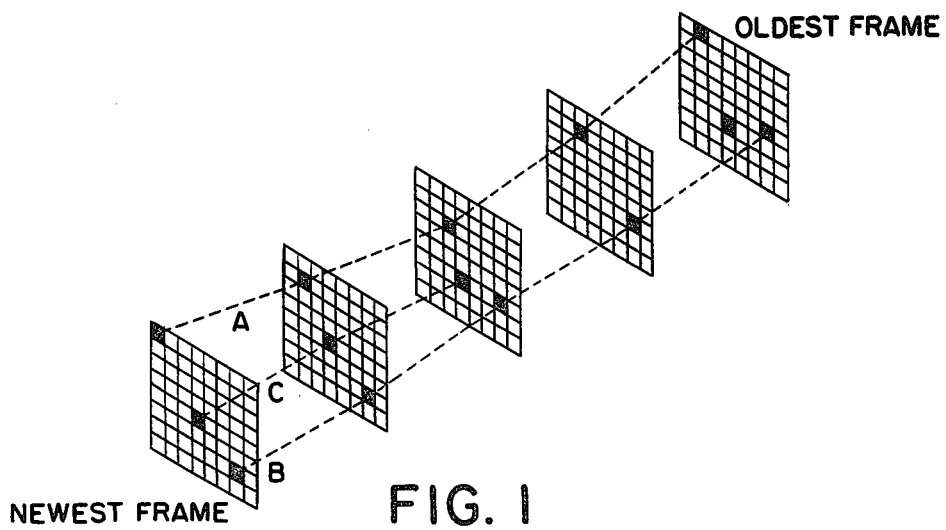
FIG. 1 illustrates the continuity concept embodied in the Boolean filter of the present invention.

One approach to the design of a track detection processor is the use of finite state sequential machines specifically constructed to detect target tracks based on a series of increasingly complex target characteristics ranging from continuity to linearity in the space-time data. This type of approach seems ideally suited to the problems of track detection because of the real time operational requirement and the potential reductions in memory and logic associated with a logical rather than arithmetic type filter operation.

The two types of sequential machines or "Boolean Filters" considered in this application are designed to eliminate those points in the space-time data which either do not form continuous strings or at the next highest level of discrimination, do not form monotonic continuous strings. These types are designated as either continuity or monotonicity filters.

The general type of Boolean filter can be described by the following equations:

$$x(n+1) = F(x(n), u(n), t(n)) \quad (1)$$

$$y(n) = G(x(n)) \quad (2)$$

where the vectors x(n), u(n), t(n), y(n), respectively denote the internal state of the machine, the input noise, the input targets, and the machine output, at time n. All components of each vector are binary variables which can assume the values 0 or 1. The input noise vector u(n) is assumed to be temporally white with all components being independent and indentically distributed. Correlated noises can be modeled within the same framework. The functions $F(\cdot, \cdot, \cdot)$ and $G(\cdot)$ are boolean expressions in their respective arguments.

The full statistical characterization of the machine operation involves the propagation of the joint density function of the machine state $p(x(n))$ along with its associated output density function $p(y(n))$. The state density function can be propagated recursively using the input noise characteristics and the state recursion relationships of Equations (1) or (2).

The continuity filter is a Boolean filter configured to accept at a fixed rate, an equal number of frames of binary data containing target and false point bits. The state recursion for an M stage continuity filter is designed so as to output an equal number of binary frames, in which each point in any output frame must have associated with it a continuous stream of M points. Thus, those noise points which do not form long continuous streams in space-time will be filtered out.

For an M stage filter, the machine state at time n is organized as a sequence of M an equal number of frames, the $i^{th}$ frame containing those points of the input frame at time $n-i+1$ which had a continuous stream of length i connected to them. The output at time n is simply the $M^{th}$ frame at the same time.

If $x_{ij}{}^r(n)$ represents the (i,j) pixel of memory frame r at time n, the recursive equations for state and output propagation of the continuity filter can be written as:

$$x_{ij}^1(n+1) = u_{ij}(n) \quad (3)$$

$$x_{ij}^{r+1}(n+1) = x_{ij}^r(n) \cdot \left\{ \sum_{k=-1}^{1} \sum_{l=-1}^{1} x_{i-k,j-l}^{r-1}(n) \right\} \quad (4)$$

$$r = 1, 2, \ldots, M-1$$

$$y_{ij}(n) = x_{ij}^M(n) \quad (5)$$

Basically, these equations compare points in frame i with the nine adjacent points in frame i-1 to determine if the continuity requirement is satisfied.

The basic concept of the continuity filter is illustrated in FIG. 1. As shown therein, data points in two successive frames are said to be continuous if their respective cell locations are adjacent or identical. Thus, strings A and B are composed of data points continuous over the full five-frames and are called continuous tracks. String C is not continuous due to a missing data point in the second-oldest frame.

As discussed below, the full statistical characterization of a continuity filter requires the recursive propagation of the joint density function $p(x(n))$. The filter's performance, however, can be adequately described by the development of a good upper bound on A(i), the steady state probability of false points occurring in frame (or stage) i of the filter. An upper bound on this probability can be recursively developed if the conservative assumption is made that in each stage the random variables $x_{ij}{}^r(n)$, i, j=1, . . . , N, are independent. For this case, the upper bound on A(i), designated by $\overline{A}(i)$, obeys the following equation:

$$\overline{A}(i+1) = \alpha(1-(1-\overline{A}(i))^9) \quad (6)$$

where $\alpha$ is the probability of a false point in the input data frames.

Figure 2:
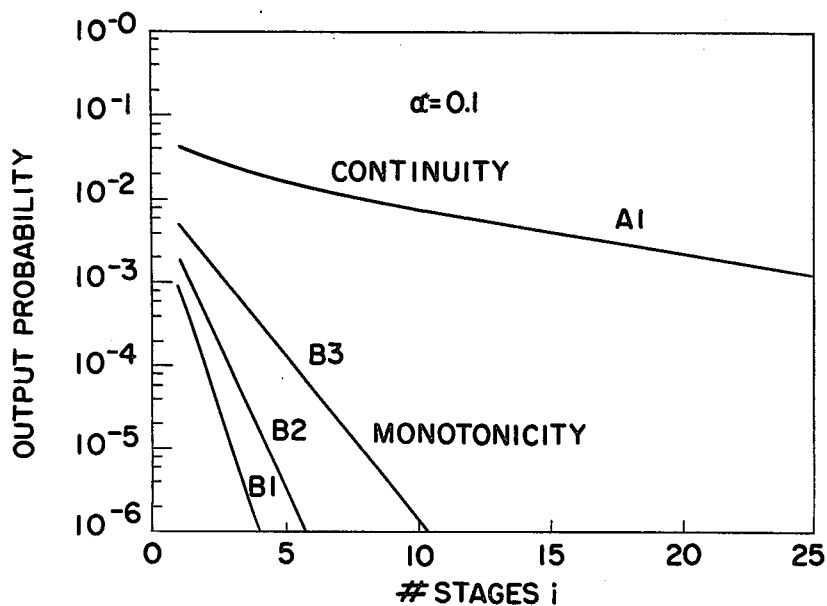
FIG. 2 is a plot of probability of output false points for an input exceedance rate of 10%.
Figure 3:
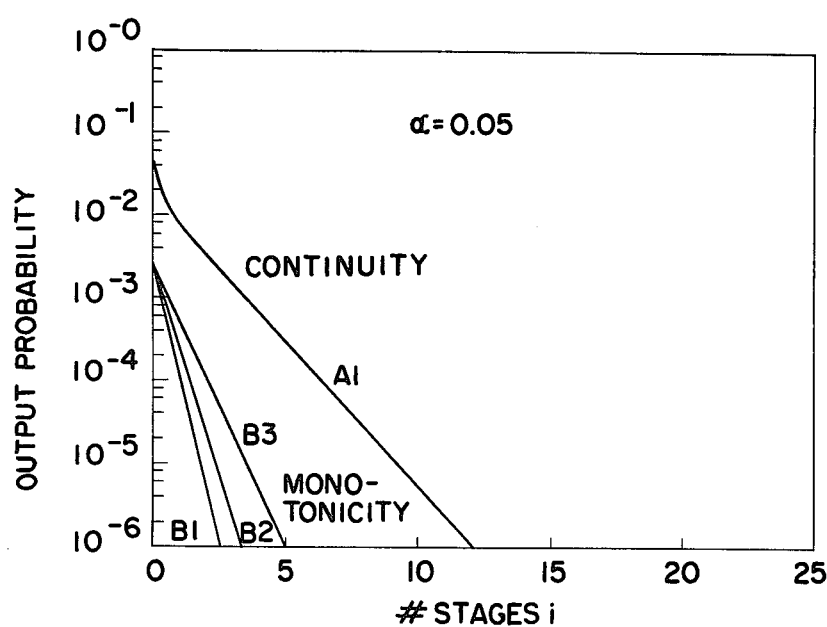
FIG. 3 is a plot of probability of output false points for an input exceedance rate of 5%.

The solution of Equation (6), for $\alpha=0.1$ and 0.05, is plotted in FIGS. 2 and 3 as a function of the number of stages in the continuity filter. As shown therein, an interesting phenomena is exhibited by the solution of Equation (6). For a given input false point probability $\alpha$, there exists a non-zero steady state solution where, independent of the number of stages, the false point rate remains constant. This is surprising in view of the fact that points can only be deleted as the number of stages increases. This asymptotic limit can be seen to be approached by curve A1 in FIG. 2.

Because the false point rate does not drop off rapidly as a function of stages for input exceedance greater than 5%, a more discriminating type of continuity was developed in which only monotone sequences of bits in space-time were allowed to pass.

Using the same general structure as the continuity filter, the monotonicity filter is configured so as to allow only those continuous tracks to pass which are monotonic in nature. Referring again to FIG. 1, it is observed that track B is both continuous and monotonic whereas track A is only continuous. There are nine possible types of monotonic tracks: straight; up, down, right, left; up right, up left, down right, and down left. The track type is noted at every stage in the monotonicity filter. A straight type can change into any other type if the track begins to move in that direction. Up types can only change into up rights or up lefts, similarly for downs, rights and lefts. Up rights, etc. cannot change into other types and are either continued or deleted.

As in the case of the continuity filter, upper bounds on $B_j(i)$, the steady state probability that a given pixel in the $i^{th}$ memory frame will contain a string of type j, can be established using the conservative assumption of independent random variables within a given memory frame. The equations which govern the type probabilities are identical within the following three classes: straight; up, down, right, left; up right, . . . , down left, allowing the upper bounds on the representative class probabilities to be designated (respectively) by $\overline{B}_1(j)$, $\overline{B}_2(j)$, $\overline{B}_3(j)$. These probabilities can be shown to satisfy the following recursive equations.

$$\overline{B}_1(j+1) = \alpha \overline{B}_1(j) \quad (7)$$

$$\overline{B}_2(j+1) = \alpha(1-\overline{B}_1(j))(1-\overline{B}_2(j))^2 \quad (8)$$

$$\overline{B}_3(j+1) = \alpha(1-(1-\overline{B}_1(j))(1-\overline{B}_2(j))^4(1-\overline{B}_3(j))^4) \quad (9)$$

$$\overline{B}_1(2) = \overline{B}_2(2) = \overline{B}_3(a) = \alpha^2 \quad (10)$$

The solution of these upper bound probabilities as a function of the number of stages in the monotonicity filter is shown in FIGS. 2 and 3 for input exceedance rates of 10% and 5%, respectively. Again, for high exceedance rates, the stable limit point phenomena observed in the continuity filter performance, occurs in the monotonicity case as well. The performance gain achieved by the use of the more discriminating monotonicity filter is apparent in all cases.

The existence of dead cells or channels in the detector array can produce severely degraded performance in the form of increased noise leakage and decreased probability of track detection. By including a single bit dead cell memory to the filter, not allowing new tracks to be initiated on a dead cell, and never deleting an established track that crosses a dead cell, the effects of dead cells on the detection performance can be minimized.

The continuity and monotonicity filters, because of the recursive nature of their propagation equations, are particularly suited to a shift register type of implementation.

Figure 4:
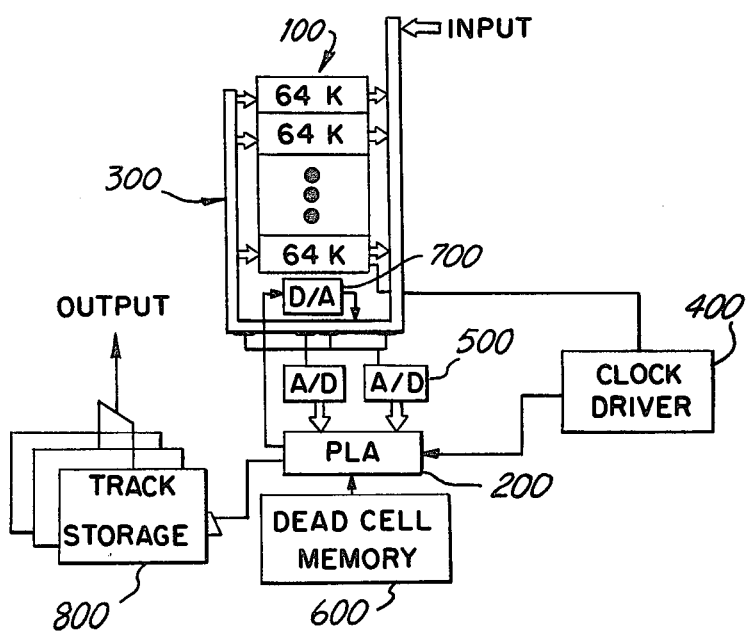
FIG. 4 is a block diagram of a Boolean filter, in accordance with the present invention.

A monotonicity filter implemented utilizing charge-coupled devices (CCD) in which virtually all of the filter's operation is achieved by a parallel shifting of frame memory data into and out of a serial CCD data bus is illustrated in FIG. 4. As shown therein, the input binary data frames, each containing an equal number of points, comprising the pixel information to be logically and sequentially compared is stored in a plurality of CCD shift registers 100, consisting, for example, of Fairchild F264. The stored data are non-destructively sensed, and used to drive a programmed logic array (PLA) 200, such as, for example, Harris HM-0104, via the CCD access bus 300, under the control of a clock driver 400. The input data frames to be sequentially compared on a point by point basis are interfaced with the logic array 200 by means of a plurality of analog-to-digital (A/D) converters 500, consisting, for example, of Harris HI5-5712A-8. The dead cell memory 600, consisting, for example, of Harris HM-76160, also drives the PLA 200 allowing the compensation technique described above to be efficiently implemented. The output of PLA 200 is then used to update the appropriate pixel information on the CCD bus 300, via an appropriate interface comprising a digital-to-analog (D/A) converter 700, consisting, for example, of Harris HI1-0562-8. The filtered output data are stored in a track memory comprising a plurality of CCD storage devices 800, consisting, for example, of Fairchild F264.

By appropriately programming logic array 200 only those sequentially compared points which result in the generation of a monotonic track are outputted to the track memory 800.

It is clear that the above description of the preferred embodiment in no way limits the scope of the present invention which is defined by the following claims.

What is claimed is:

1. A method of filtering in real time space-time data consisting of a plurality of binary data frames each containing an equal number of points comprising the steps of:
   (a) storing sequentially each of the plurality of binary data frames;
   (b) recursively determining whether the points of a sequence of M, where M is an integer, of the plurality of stored binary data frames forms at least one continuous string by logically comparing each of the stored binary data frames comprising said sequence of M with the binary data frame which preceded it and the binary data frame which followed it on a point by point basis; and
   (c) outputting the points of each of said compared binary data frames which when compared with the points in the other stored binary data frames comprising said sequence of M form a continuous string, said outputted points being filtered space-time data.

2. A method of filtering in real time space-time data consisting of a plurality of binary data frames each containing N×N, where N is an integer, points comprising the steps of:
   (a) storing sequentially each of the plurality of binary data frames;
   (b) recursively determining whether the points of a sequence of M, where M is an integer, of the plurality of stored binary data frames forms at least one continuous string by logically comparing each of the stored binary data frames comprising said sequence of M with the binary data frame which preceded it and the binary data frame which followed it on a point by point basis only for those previously compared points which form a continuous string; and
   (c) outputting the points of each of said compared binary data frames which when compared with the points in the other stored binary data frames comprising said sequence of M form a continuous string, said outputted points being filtered space-time data.

3. A method of filtering in real time space-time data consisting of a plurality of binary data frames each containing N×N, where N is an integer, points comprising the steps of:
   (a) storing sequentially each of the plurality of binary data frames;
   (b) recursively determining whether the points of a sequence of M, where M is an integer, of the plurality of stored binary data frames forms at least one continuous string by logically comparing each of the stored binary data frames comprising said sequence of M with the binary data frame which preceded it and the binary data frame which followed it on a point by point basis only for those previously compared points which form a monotonic string; and
   (c) outputting the points of each of said compared binary data frames which when compared with the points in the other stored binary data frames comprising said sequence of M form a monotonic string, said outputted points being filtered space-time data.

4. Apparatus for filtering in real time space-time data consisting of a plurality of binary data frames containing an equal number of points comprising:
   (a) means for storing sequentially each of the plurality of binary data frames;
   (b) means for recursively determining whether the points of a sequence of M, where M is an integer, of the plurality of stored binary data frames forms at least one continuous string by logically comparing each of the stored binary data frames comprising said sequence of M with the binary data frame which preceded it and the binary data frame which followed it on a point by point basis; and
   (c) means for outputting the points of each of said compared binary data frames which when compared with the points in the other stored binary data frames comprising said sequence of M form a continuous string, said outputted points being filtered space-time data.

5. Apparatus for filtering in real time space-time data consisting of a plurality of binary data frames each containing N×N, where N is an integer, points comprising:
- (a) means for storing sequentially each of the plurality of binary data frames;
- (b) means for recursively determining whether the points of a sequence of M, where M is an integer, of the plurality of stored binary data frames forms at least one continuous string by logically comparing each of the stored binary data frames comprising said sequence of M with the binary data frame which preceded it and the binary data frame which followed it on a point by point basis only for those previously compared points which form a continuous string; and
- (c) means for outputting the points of each of said compared binary data frames which when compared with the points in the other stored binary data frames comprising said sequence of M form a continuous string, said outputted points being filtered space-time data.

6. Apparatus for filtering in real time space-time data consisting of a plurality of binary data frames each containing N×N, where N is an integer, points comprising:
- (a) means for storing sequentially each of the plurality of binary data frames;
- (b) means for recursively determining whether the points of a sequence of M, where M is an integer, of the plurality of stored binary data frames forms at least one continuous string by logically comparing each of the stored binary data frames comprising said sequence of M with the binary data frame which preceded it and the binary data frame which followed it on a point by point basis only for those previously compared points which form a monotonic string; and
- (c) means for outputting the points of each of said compared binary data frames which when compared with the points in the other stored binary data frames comprising said sequence of M form a monotonic string, said outputted points being filtered space-time data.

7. An apparatus as recited in claims 4, 5 or 6 further comprising timing means for causing said binary data frames to be sequentially stored in said storing means.

* * * * *